United States Patent [19]
Gilje

[11] Patent Number: 5,322,432
[45] Date of Patent: Jun. 21, 1994

[54] APPARATUS FOR MAKING FROZEN EDIBLE PRODUCTS

[75] Inventor: Hans F. Gilje, Kristiansand, Norway

[73] Assignee: Hennig-Olsen Is A/S, Kristiansand, Norway

[21] Appl. No.: 949,495

[22] PCT Filed: Dec. 4, 1991

[86] PCT No.: PCT/NO91/00152
§ 371 Date: Oct. 26, 1992
§ 102(e) Date: Oct. 26, 1992

[87] PCT Pub. No.: WO93/00824
PCT Pub. Date: Jan. 21, 1993

[30] Foreign Application Priority Data

Jul. 4, 1991 [NO] Norway .................. 912624

[51] Int. Cl.$^5$ .................. A23G 9/14
[52] U.S. Cl. .................. 425/091; 425/99; 425/110; 425/114; 425/232; 425/453; 426/282; 426/283
[58] Field of Search .................. 425/92, 93, 110, 121, 425/118, 114, 453, 110, 99, 232; 249/120; 426/95, 282, 283; 198/468.2, 468.4, 471.1, 803.14, 803.15; 141/111, 266, 275

[56] References Cited

U.S. PATENT DOCUMENTS

| | | | |
|---|---|---|---|
| 786,816 | 4/1905 | Hutchison | 425/91 |
| 1,297,917 | 3/1919 | Schmitt | 425/93 |
| 2,106,893 | 2/1938 | Krein | 426/282 |
| 2,267,494 | 12/1941 | Dotzer | 426/282 |
| 2,448,827 | 9/1948 | Reder, Jr. | 249/120 |
| 2,625,120 | 1/1953 | Eddy et al. | 425/93 |
| 2,843,038 | 7/1958 | Manspeaker | 249/120 |
| 3,104,665 | 9/1963 | Towns | 249/120 |
| 3,171,367 | 3/1965 | Carter et al. | 426/282 |
| 3,478,702 | 11/1969 | Simonich | 425/118 |
| 3,580,188 | 5/1971 | Lutsey | 425/91 |
| 3,602,154 | 8/1971 | Schimkat | 425/110 |
| 4,100,304 | 7/1978 | Getman | 426/282 |
| 4,188,768 | 2/1980 | Getman | 426/282 |
| 4,527,972 | 7/1985 | Carlsson | 425/440 |

FOREIGN PATENT DOCUMENTS 127370 9/1973 Sweden.

Primary Examiner—Jay H. Woo
Assistant Examiner—Joseph Leyson
Attorney, Agent, or Firm—Wenderoth, Lind & Ponack

[57] ABSTRACT

An apparatus includes an endless conveyor formed with transverse rows of holes each adapted to receive a preform to be filled with ice cream or other edible substances from an upper filler assembly adapted to move intermittently synchronically with the conveyor during operation of the thereof. Under an upper run of such first endless conveyor, in the area at the filler assembly, is a second endless conveyor adapted to move synchronically with the first endless conveyor and carrying transverse rows of liftable and lowerable suction cups which in their turn are adapted to be lifted up through an overlaying row of the holes for engaging and removing a respective preform from a dispenser station in the filler assembly and lowering the preform onto the first endless conveyor while holding it in correct position during the subsequent filling operations. A wall portion is radially spaced around each hole to prevent displacement of filled preforms resting on the first endless conveyor but not fitting into the holes.

6 Claims, 8 Drawing Sheets

APPARATUS FOR MAKING FROZEN EDIBLE PRODUCTS

BACKGROUND OF THE INVENTION

The present invention relates to an apparatus for making frozen edible products, typically ice cream products. Ice cream is marketed in a large variety of grades and shapes, such as cones, flat-bottomed troughs, rectangular sandwiches and various cup shapes. Most of the products, in addition to the ice cream proper, also contain various fillings and top decorations.

The products are formed more or less automatically, such as by filling ice cream into containers in the form of cornets, cups or the like, then moving the filled products into a freezing or hardening compartment, and finally picking up the frozen products ready for packing. In the simplest production systems, no particular means are provided to hold the products upright during the freezing process. As a result, the decoration tends to creep downwards and outwards when the products are laying down during the freezing process, leaving a diffuse and less attractive appearance. There are more advanced machines on the market, in which the products are held upright also during the freezing/hardening process. However, until now, all such types of machines have been encumbered with low capacity and/or limited flexibility. The machines are generally built for producing either cone or cup shaped ice cream and rarely both kinds. Machines capable of producing both have a low capacity, from 4000 to 8000 items per hour. Also, such machines are very expensive, and shifting from one product to another takes considerable time and tends to cause running-in problems.

Today there are three main machine varieties available for producing cup or cone shaped ice cream products with the products standing upright. According to one such variety the products are filled by a traditional filling machine such as a so-called "Fornaroli" or "Viking" in four or six rows. After the products have been filled and provided with lids they are lifted up from the machine by means of vacuum or tongues and placed in plastic or steel cages formed with holes to accomodate the products. The filled cages are then moved into a traditional freezing tunnel or cabinet, e.g. of the spiral type. When frozen the products are picked up from the cages and packed. The empty cages then return to the filling machine to be filled with products again.

This prior system has a large capacity but very low flexibility. The diameter of the cage holes must match the associated filling machine equipment, and consequently such a production system is normally not feasible for more than two different products. If more than two variants are required, then a completely new set of cages must be provided and in addition all of the filling machine product dispensers must be replaced. Also, the largest product diameter should not exceed the maximum diameter for which the filling machine is designed. In addition, this system is limited to a certain product taper angle, with a corresponding limitation of possible variants. Therefore, machines of this type very seldom allow for more than two or three different product variants. As a result only the very largest ice cream makers use such equipment, since the investments are high and require continuous production. Furthermore, cleaning of the cages represents a considerable problem and the cages occupy a considerable space when not in use.

A second wellknown type of machine is sold in several variants such as the so-called Straight Line, Glacier, Gram and Cattabriga machines. These mainly consist of a long continuous chain provided with squared steel trays. Holes are formed in the trays to receive the product to be run on the machine. Usually there are up to six products per tray. The capacity of this machine is low and large expenses are required for replacing trays, etc., if high flexibility is to be obtained.

There is also a third machine variant exemplified by U.S. Pat. No. 3,580,188. This is a 6-row type of machine in which the products are filled and frozen in a traditional manner. After dwelling for about 15 minutes in the freezing tunnel the products are turned upside-down and emerge depending with their tops down. This prior machine requires a very long freezing tunnel in order to ensure sufficient hardening of the products before upsetting them. The machine construction is useful for conical products only.

Swedish Patent No. 127 370 describes an endless conveyor machine specifically designed for producing ice lollies. Trays carried by the conveyor are lifted and rotated horizontally a quarter turn by cylinder means below the conveyor upper run to permit insertion of sticks into the ice bodies formed on the trays.

SUMMARY OF THE INVENTION

The main object of the present invention is to combine large capacity with flexibility, thus making it possible to produce a wide range of products at high speed on the same machine without large investments in rebuild adjustments and correspondingly long adjustment periods. Also, the machine should keep the products in an upright position throughout the production process, to obtain an optimum top decoration having sharp and clear contours.

According to the invention these objects are obtained through an apparatus as defined below.

BRIEF DESCRIPTION OF THE DRAWINGS

The invention and its advantages will clearly appear from the following detailed description thereof, with reference to the accompanying rather schematic drawings in which.

DETAILED DESCRIPTION OF THE INVENTION

Figure 1:
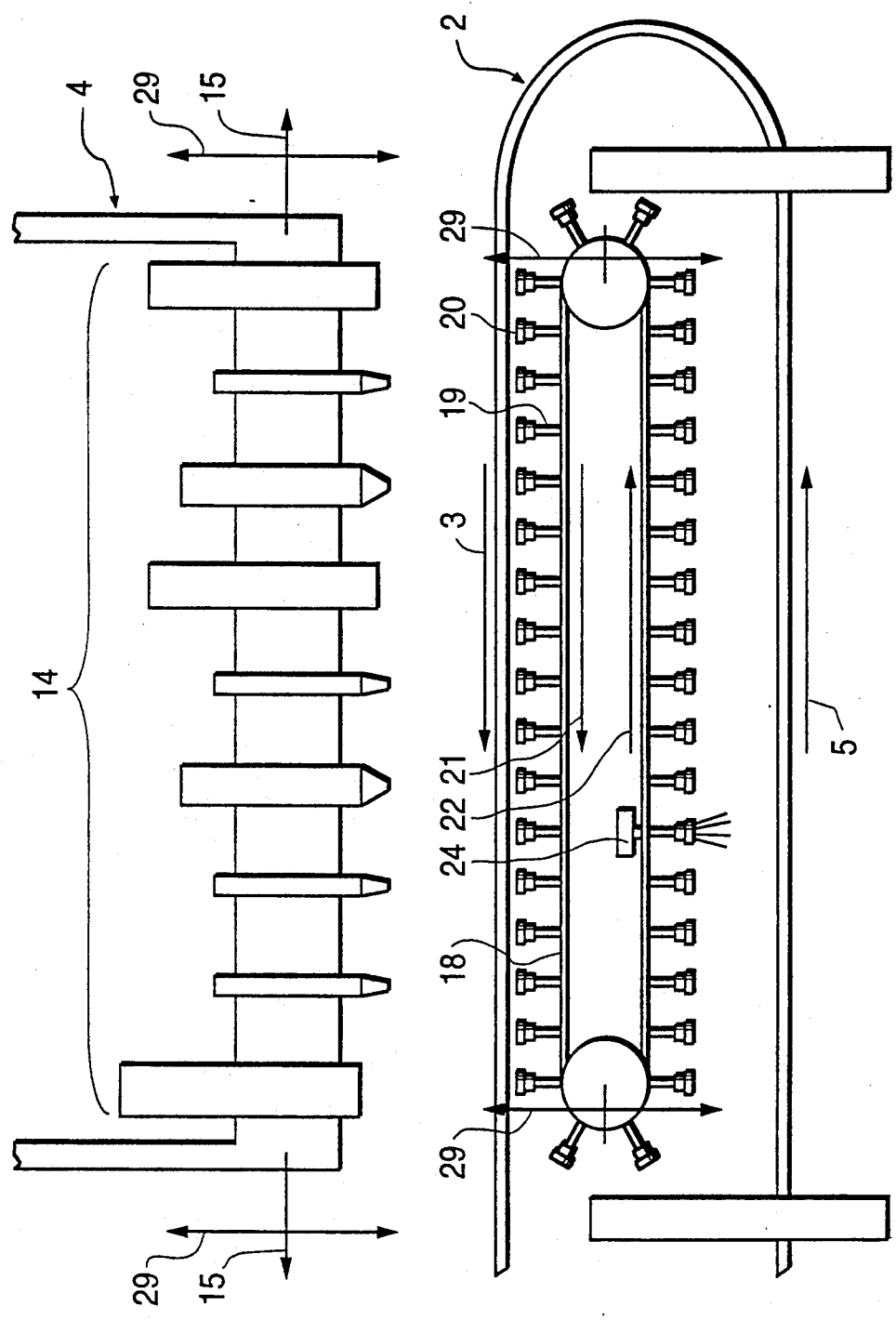
FIG. 1 is a partial elevational view of a machine primarily for production of ice cream and incorporating an apparatus according to the invention.

In FIG. 1 numeral 2 refers to an endless conveyor for conveying preforms which, by means of a filling assembly 4 located above the conveyor 2, are filled with ice cream and possibly taste and colored additives, and are furnished with top decorations before advancing to further processing stations or sections such as freezing or hardening section 25 (FIG. 2) and a pick-up station (not shown). By "preform" in this context is meant any top open container or substrate made of any convenient material such as cardboard, plastics, pastry, etc., and of any shape such as cone or cornet, cup, etc.

Figure 2:
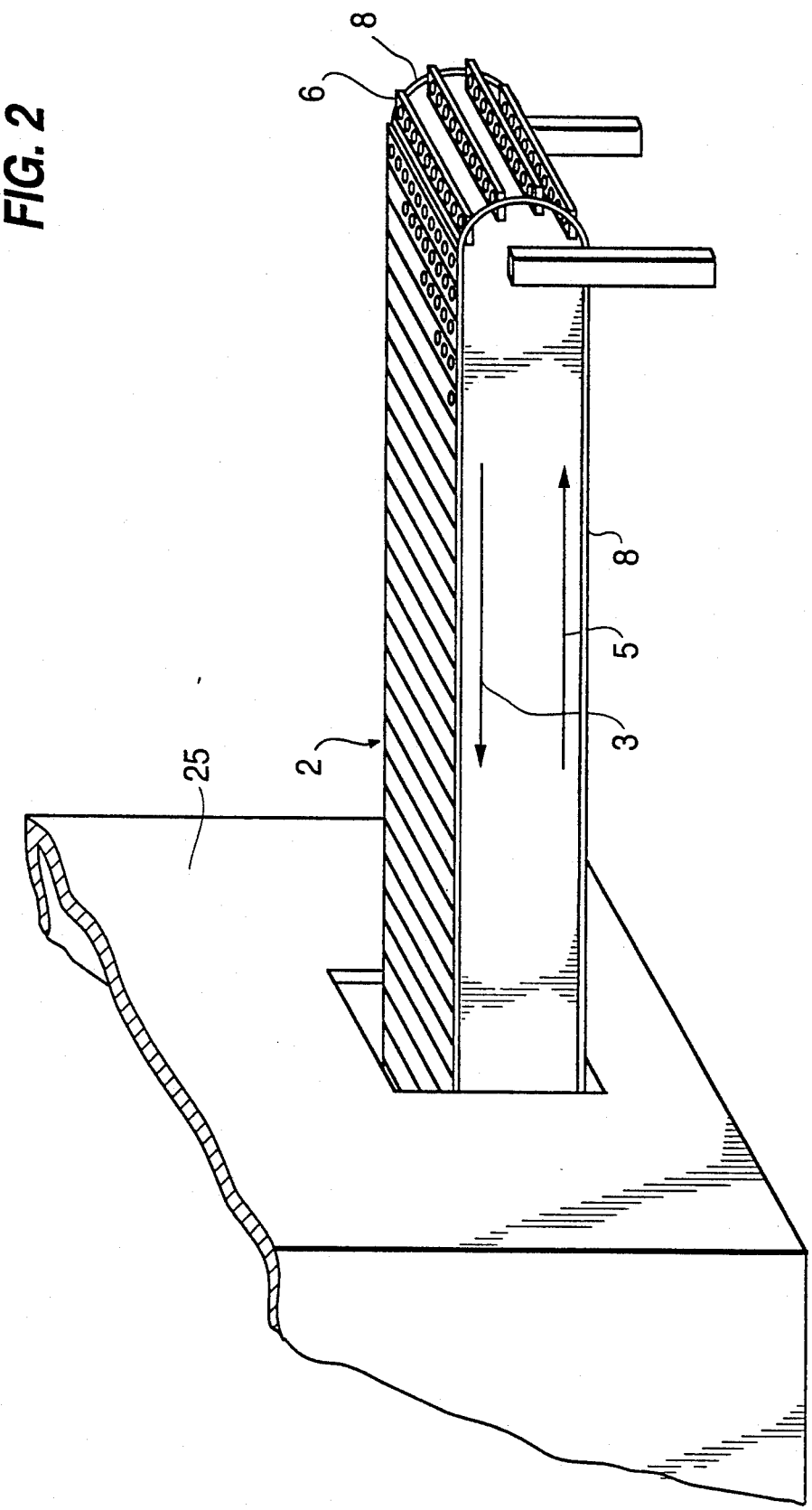
FIG. 2 is a perspective view showing parts of the machine of FIG. 1.
Figure 3:
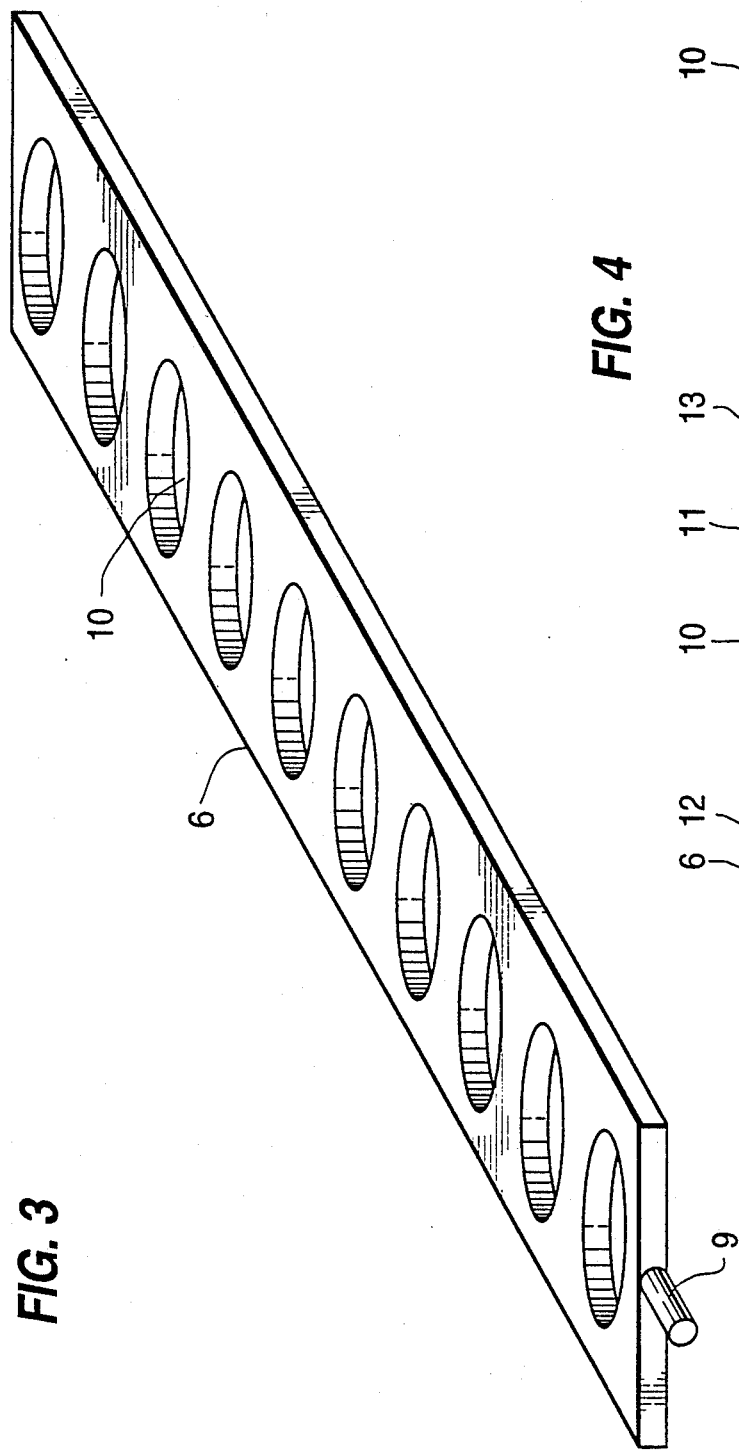

The conveyor 2 as shown is generally of a conventional type comprised of a plurality of rectangular carrier plates or trays 6 mounted between two parallel spaced conveyor chains 8, as illustrated in FIG. 2, for moving along an upper and lower runs 3 and 5. Each tray 6 can generally be of a form as shown in FIG. 3, for example, with a plurality of apertures or holes 10 arranged in a transverse row and each adapted to receive a preform standing upright therein. In the example shown there are ten holes in a row, i.e. there are ten product lines across the width of the conveyor 2.

Figure 4:
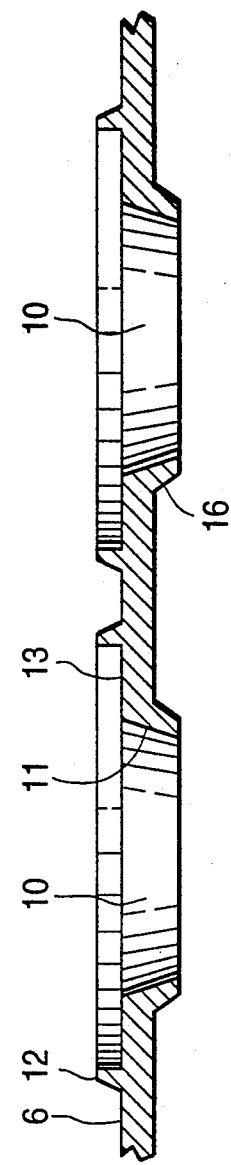
FIGS. 3 and 4 are perspective and cross-sectional views, respectively, of a machine part.

The trays 6 are pivotally supported between the conveyor chains 8 by means of pivots 9 at each end along the central axis of the tray, such that the trays in a conventional manner, by means of guide members not shown, retain their horizontal position when moving around the conveyor chain turn sprockets (not shown) as indicated at the right hand side of FIG. 2. In FIG. 4 a longitudinal section through a portion of a conveyor tray 6 is shown to a larger scale and in more detail. The holes 10 are defined by a circumferential, frustoconical support surface or socket 11 generally matching the shape of conical products to be carried therein. The socket 11 extends downward, e.g. 5-6 mm, to form a support rim 16 on the tray bottom side, in a per se known manner. The mean diameter of the holes 10 is practically selected to keep all current cone-shaped products standing upright therein owing to their weight distribution. A suitable hole diameter would be about 45 mm.

According to the invention, as a new and specific feature of the tray 6, there is a raised wall portion 12 surrounding, in a radially spaced relationship, each of the holes 10 of a conveyor tray 6, leaving a support or land portion 13 between such wall portion 12 and the edge of hole 10, for supporting flat-bottomed preforms that do not fit into the circular holes 10 in the trays 6. The wall portions 12 serve to keep such flat bottomed preforms in place on the trays as explained more fully below. By "raised wall portion" is meant raised relative to the holes 10, i.e. to the plane of the land portion 13.

If desirable, instead of single row trays such as tray 6 illustrated in the drawings, trays having several parallel rows of holes symmetrically disposed on each side of the center axis of the tray may be used.

Like the product conveyor 2 the filler assembly 4 schematically illustrated in FIG. 1 may be of a conventional type comprising a plurality of stations, generally denoted by reference numeral 14, such as a preform dispenser, one or more stations for ice cream filling, nut vibrator, jam applicator, top decoration applicator, lid dispenser and pleating means. Thus, the stations 14 of the filler assembly 4 each comprise a transverse row of ten identical dispensers, filler nozzles, etc, i.e. one for each of the ten product lines of the conveyor 2. The filler assembly 4 is reciprocally arranged in the longitudinal direction of the product conveyor 2 as indicated by arrows 15 in FIG. 1, such that all of the stations intermittently follow the movement of the conveyor during each filling operation. Conveniently this may be implemented by arranging the filler assembly 4 in a sliding carrier or the like, for example, which, like the remaining details of the filler assembly 4, is not further illustrated or described since it is merely a matter of ordinary prior art known to any skilled person.

The skilled person will also realize the importance of accurate positioning of the preforms advanced onto the product conveyor relative to the various stations of the filler assembly. Therefore, in prior machines, the frustoconical sockets of the holes in the conveyor trays have to be accurately conformed to the shape of the preforms of the type of product to be received therein, and such products must necessarily be conical in order to be stably supported in their holes. Whenever a product is to be run having a shape different from that for which the conveyor trays are made, prior machines have to have all trays of the conveyor replaced, which is a relatively time-consuming operation since a such conveyor normally is of a considerable length.

In a preferred version of the apparatus according to the present invention a second endless conveyor 18 is disposed between the upper and lower conveyor runs 3, 5 of the product conveyor 2 directly below the filler assembly 4, and adapted to move synchronically with the product conveyor 2. The conveyor 18 carries a plurality of liftable and lowerable suction cups 20 mounted on rods 19 arranged in transverse rows corresponding to the rows of holes 10 in the product conveyor trays 6 located thereabove, such that when the machine is operated there will always be a row of holes 10 directly above each of the rows of suction cups 20 in the area at the filler assembly 4.

The construction of the suction cup conveyor 18 is not shown and described in detail, since it is within the competance of the skilled artisan to implement a such conveyor in a useful manner. For example, like the product conveyor 2, it may be comprised of two parallelly extending chains in which the suction cup rods 19 with their not shown lifting means are arranged in transverse members disposed between the chains and secured thereto for moving along an upper and lower runs 21 and 22, respectively. Also the vacuum system for the suction cups and the design of the latter is a conventional technique which a skilled person will be able to carry out without a detailed description.

The machine as shown and described so far functions essentially as follows.

Figure 5:
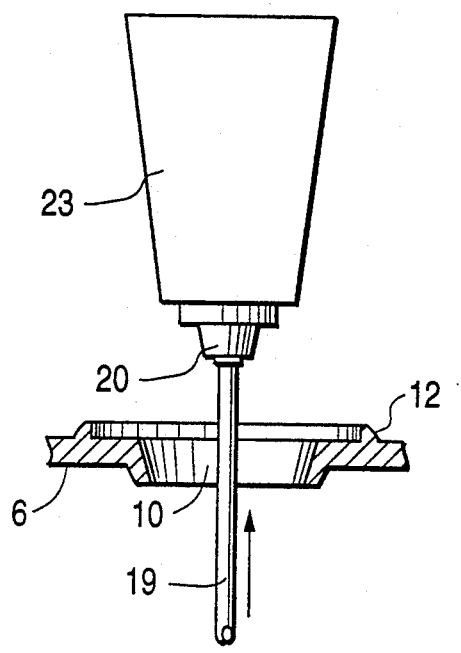
FIGS. 5-8 are partial views illustrating various steps during a product filling process.
Figure 6:
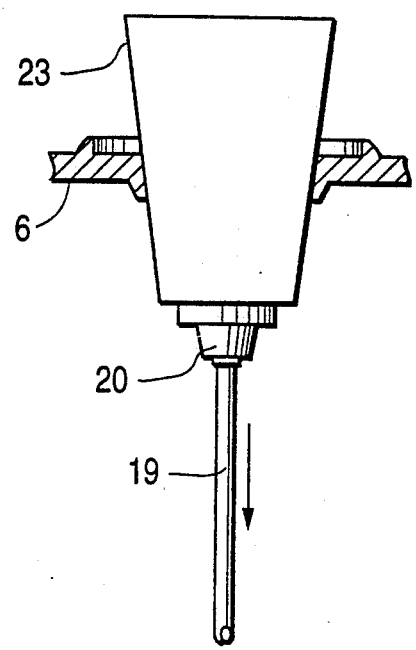
Figure 7:
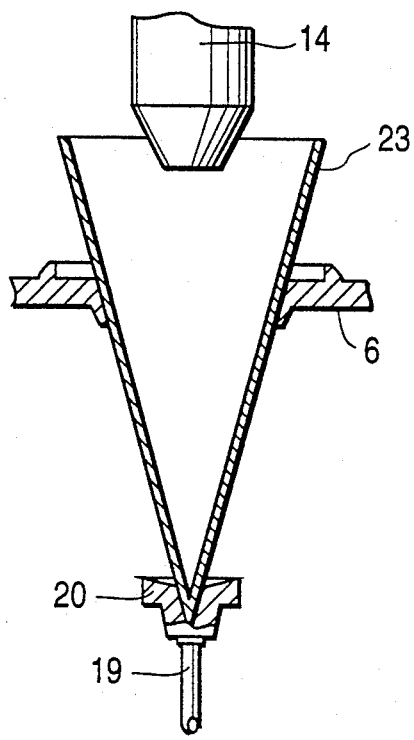
Figure 8:
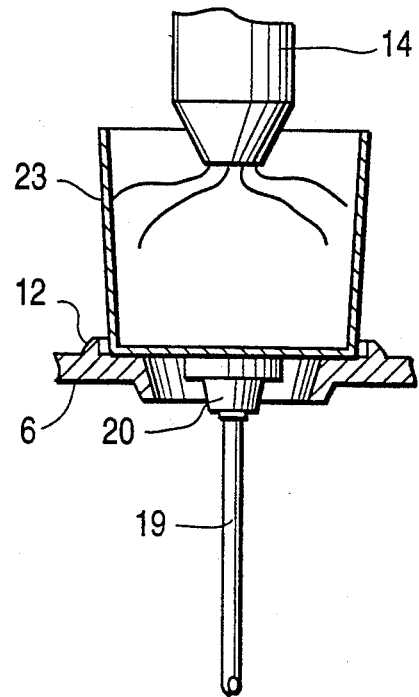
Figure 9:
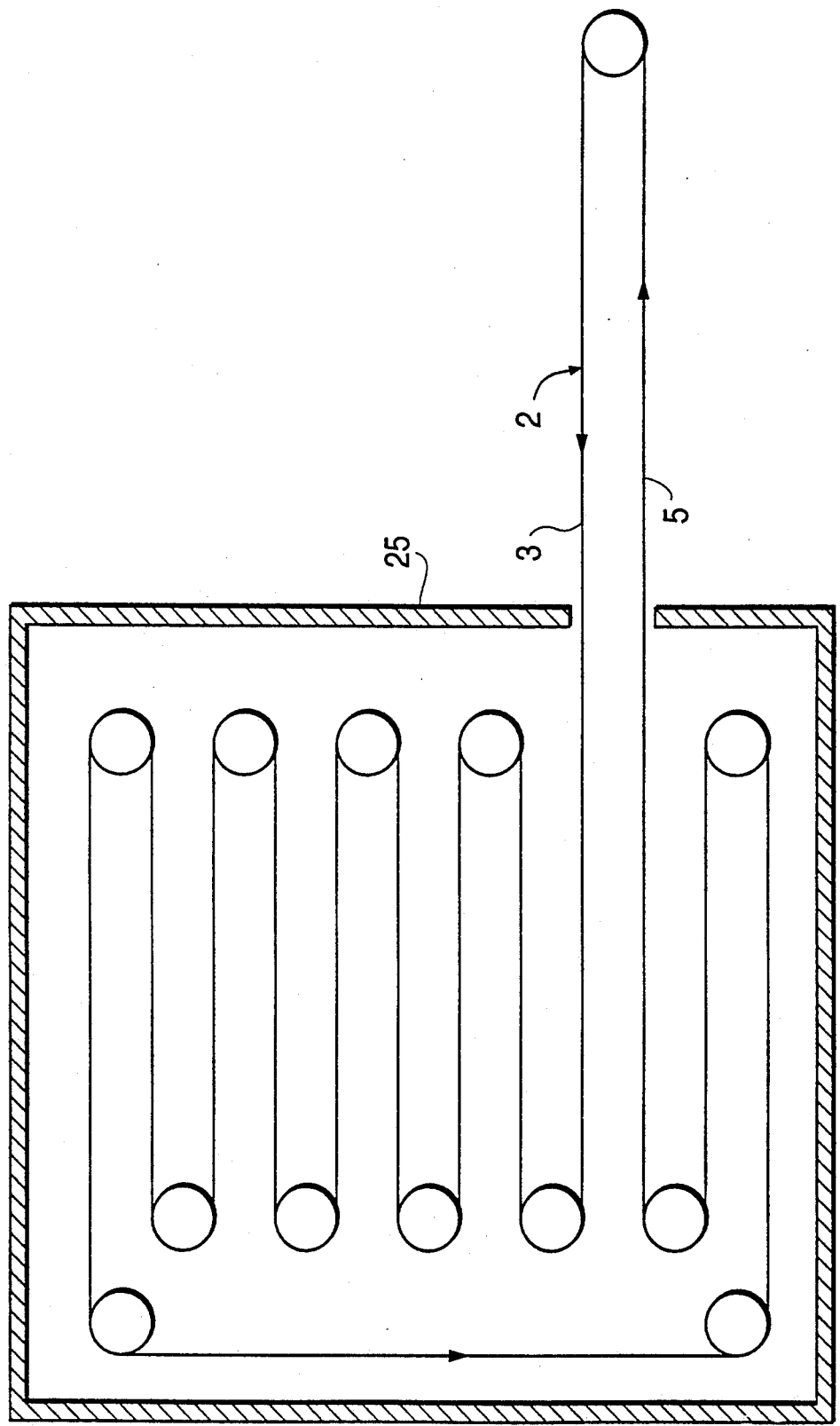
FIG. 9 is a diagrammatic elevational view of a freezing cabinet usable in the machine.

Each time a tray 6 passes under the preform dispenser station of the filler assembly 4, the underlaying row of suction cups 20 on the upper run 21 of the conveyor 18 is lifted up through the row of tray holes 10, until they each contact the bottom of a respective lowermost preform 23 of a stack of preforms in the dispenser row, thereby suctionally engaging such preform (FIG. 5). Then the suction cups 20 are lowered down to a bottom position bringing the engaged preforms with them until the latter are seated in their predetermined positions on the tray 6 (FIG. 6). When the row of preforms 23 has been positioned into or onto the product conveyor 2 as explained above, the respective remaining stations 14 of the filler assembly 4 are successively operated as the preforms passes under them. During each operation the filler assembly follows the movement of the product conveyor 2 until the operation has been completed, after which it rapidly returns to its initial position ready to serve the next row of preforms in the product conveyor 2. FIGS. 7 and 8 illustrate operations of filling a cone-shaped and a cup-shaped preform 23, respectively.

Thus, since the preforms 23 are held stably by the suction cups 20 during the filling operation, the cone angle of the sockets 10' of the tray holes 11 is not critical, i.e. it need not exactly match the preform cone angle such as in prior machines. Consequently, according to the present invention, products of varying cone angle can be stably accommodated in the tray holes 10 of the machine according to the invention.

When the last one of the successive operations of the filler assembly 4 has been completed for the row of products in a tray, the vacuum in the corresponding row of suction cups is released, allowing the latter to release their engaged product and return along the lower run 22 of the suction cup conveyor 18, back to their initial positions. Mechanisms 24 preferably are provided at the lower conveyor run for automatically cleaning the depending suction cups, e.g. by means of pressurized air, to remove any debris that may have deposited therein. Conveniently, the pressurized air is blown down through bores in the cup rods 19 and out from within the suction cups 20. The valves of the various stations 14 of the filler assembly 4 for ice cream filling, chocolate filling etc are preferably provided with a bypass valve (not shown) which is activated in case a photocell, sensor or the like detects the absence of a preform on a tray below that filler station, such that the ice cream, etc escapes through the bypass valve rather than through the station 14 filler nozzle, thereby avoiding flooding and clogging of the suction cups.

The products on the conveyor 2 are then conveyed to the next processing step which normally will be freezing (hardening) in a multifloor freezing cabinet 25, for example, as indicated in FIG. 2.

In the freezing cabinet the products are exposed to refrigeration air streams that would displace them on the trays were they not kept in place. Conical products extending down into the tray holes 10 are kept in place by the latter, in contrast to products having bottom dimensions larger than the tray hole diameter, such as the cup of FIG. 8, for example.

Figure 10:
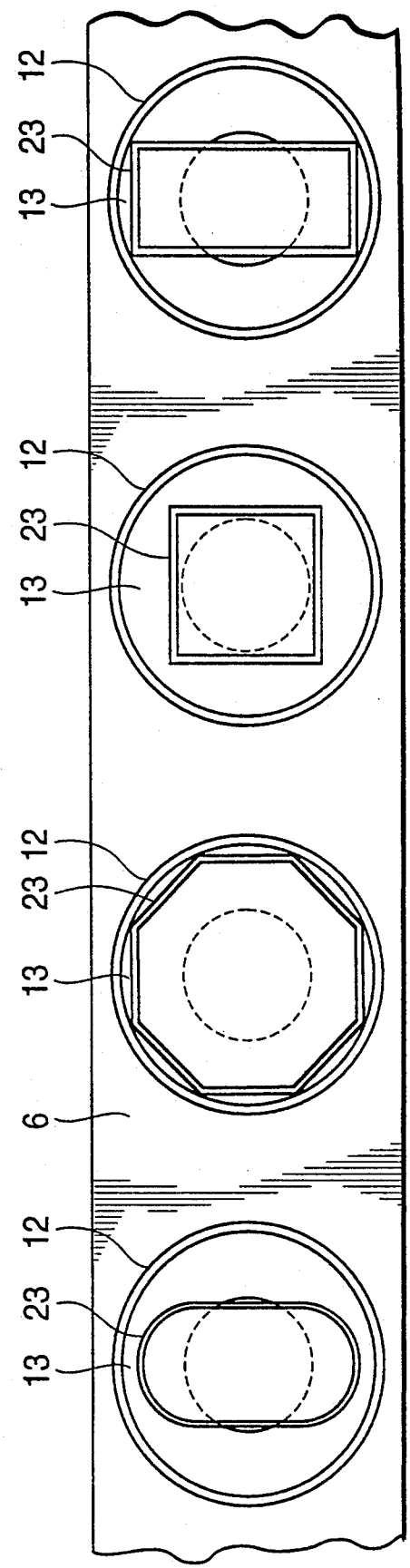
FIG. 10 is a plan view illustrating various shapes of ice cream products capable of being be produced by the machine.

This is where the importance of the raised wall portions 12 around the holes 10 on the upper surface of the trays 6 becomes clear. Thus, such wall portions 12 prevent products which rest on the land portions 13 rather than extending down into the tray holes 10 from substantial displacement on the trays during the freezing process. As a result, the same trays 6 can be used in the conveyor 2, not only for conical products of varying sizes, but also for flat-bottomed cup products of highly deviating shape, such as indicated in FIG. 10. It should be noted that although, for simplicity, the various products in FIG. 10 are shown as being placed together in one and the same tray row, normally, in operation of the machine, only one type of product at a time will be produced, i.e. the same product in all ten product lines of the conveyor.

Figure 11:
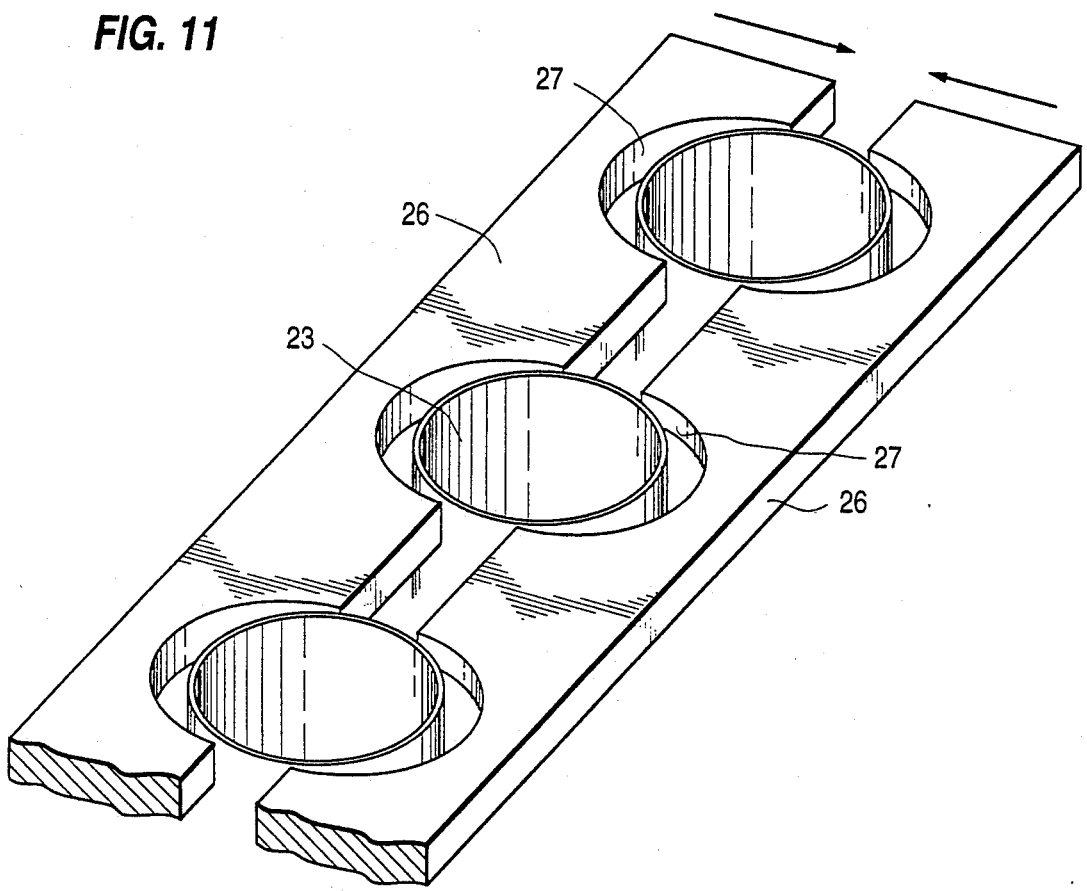
FIGS. 11 and 12 are partial views illustrating a lid application step.
Figure 12:
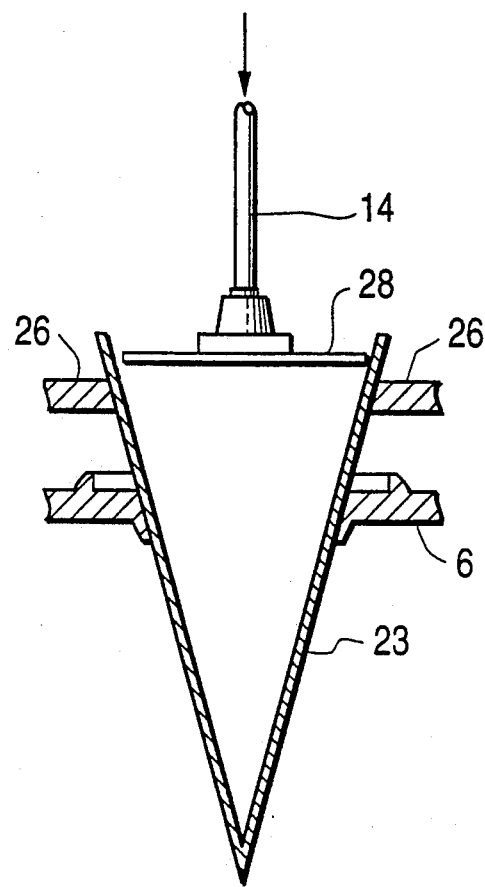
Figure 13:
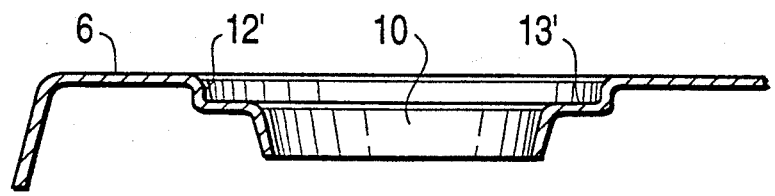
FIG. 13 is a partial view illustrating a detail of a modified machine.

In the example illustrated in FIGS. 4-12 of the drawings, the raised wall portion 12 is shown as an annular ridge protruding above the general upper surface of the tray 6. It should be understood, however, that such wall portion may take many different forms. Thus, rather than annular (circular) it could have any other suitable configurations e.g. rectangular such as square or other polygon shapes. Further, they could extend intermittently rather than continuously around their holes 10. As indicated in FIG. 13, raised wall portion 12' would also result by lowering or recessing each land portion 13' with its hole 10 relative to the top surface of tray 6. The dimensions of the wall portions 12, 12' are selected to accommodate all current products. Thus, in case of an annular wall portion, a suitable diameter would be about 8-12 cm, preferably about 10 cm. A suitable height of the wall portion 12, 12' would be about 5-10 mm, but of course it may be lower or higher if desirable.

Although, as explained above the suction cups 20 keep the preforms stably in exact positions during the entire filling process, during lid application and pleating, which normally will be the last operation of the filling process, an accuracy beyond that achieved by the suction cups 20 may be required. This may be achieved in a manner known per se by using aligning means in the form of a pair of arms or jaws 26 having semicircular recesses 27 adapted to the product shape as indicated in FIG. 11. The jaws 26 clamp each preform 23 and keep it in an exactly desired position during application of a lid 28, as shown in FIG. 12.

When the products emerge from the freezing cabinet 25 and move along the bottom run 5 of the conveyor 2 they will meet a pick-up means (not shown) of known type, e.g. a pick-up robot for automatic packaging. At such pick-up means there may conveniently be provided an aligning means of the same type as the jaw means 26 at the lid applicator station of the filler assembly, such that those products which may be slightly disaligned in the hole 10 or slightly displaced within the raised wall portion 12, 12' are aligned before pick-up.

As will appear from FIGS. 6-8 the various preforms may be of different heights relative to the trays 6. Therefore the height of the filler assembly 4 and suction cup conveyor 18 may be adjusted as indicated by arrows 29 in FIG. 1, enabling their level to be preset for the product to be produced. The construction of a such height levelling means is also within the competence of the skilled person, e.g. based on well known hydraulic principles.

As noted above, the suction cups 20 carried by the conveyor 18 are preferred means for keeping the preforms 23 in exact aligned positions during the filling operation. However, any other suitable gripping means may be used to perform this function. For example, a set of jaws like the aligning jaws 26 described above in connection with lid application could be used. In that case the preforms 23 would be dropped rather than drawn from their dispenser stack in the filler assembly 14.

From the above description it will be clear that the machine as shown and described will be able to produce ice cream products of substantially varying shapes, with a minimum of intervention when shifting from one product to another. Generally, nothing more than preform and lid dispensers have to be replaced, which is a relatively simple and rapid operation.

Although the apparatus according to the invention has been described and illustrated in connection with a machine for making ice cream products, it is of course not limited to such products. Thus, edible materials other than ice cream, e.g., youghurt, suffle, etc, could be filled from the filler assembly 4 into the various preforms 23, for subsequent freezing, cooling or a heat/cool process.

I claim:

1. An apparatus for use in making frozen or cooled edible products of various shapes, said apparatus comprising:

an endless product conveyor including an upper run and a lower run and plural transverse rows of preform receiving holes;

a filler assembly located above said product conveyor to operate in synchronism therewith and including a dispenser station to contain a plurality of preforms to be dispensed onto said upper run of said product conveyor at said holes and a product station to fill edible product into preforms on said product conveyor;

an endless second conveyor located between said upper run and said lower run of said product conveyor to operate in synchronism therewith, said second conveyor including transverse rows of suction members movable upwardly through respective overlying rows of said holes in said upper run of said product conveyor to grip preforms from said dispenser station and then movable downwardly to lower the thus gripped preforms onto said product conveyor at said respective rows of holes and to support the preforms thereat during filling at said product station; and each said hole having positioned therearound a radially outwardly spaced raised wall portion defining a land portion between said hole and said raised wall portion, such that the preform gripped by the respective said suction member may be supported thereby in said hole or on said land portion, depending on the shape of the preform.

2. An apparatus as claimed in claim 1, wherein said suction members comprise suction cups.

3. An apparatus as claimed in claim 1, wherein said raised wall portion is circular with a diameter of about 5-10 cm.

4. An apparatus as claimed in claim 1, wherein said raised wall portion comprises a ridge extending above a top surface of said product conveyor.

5. An apparatus as claimed in claim 1, wherein said raised wall portion extends downwardly from a top surface of said product conveyor such that said land portion is recessed below said top surface of said product conveyor.

6. An apparatus as claimed in claim 1, wherein said second conveyor has an upper run and a lower run, and further comprising means for automatically cleaning said suction members in said lower run of said second conveyor.

* * * * *